(12) United States Patent
Moreillon et al.

(10) Patent No.: US 10,878,848 B2
(45) Date of Patent: *Dec. 29, 2020

(54) APPARATUS FOR MANAGING MEMBERS OF AT LEAST ONE GROUP OF DECODERS HAVING ACCESS TO BROADCAST DATA

(71) Applicant: NAGRAVISION S.A., Cheseaux-sur-Lausanne (CH)

(72) Inventors: Guy Moreillon, Bioley-Orjulaz (CH); Alexandre Karlov, Meyrin (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 45 days.

This patent is subject to a terminal disclaimer.

(21) Appl. No.: 15/643,082

(22) Filed: Jul. 6, 2017

(65) Prior Publication Data

US 2017/0359716 A1 Dec. 14, 2017

Related U.S. Application Data

(63) Continuation of application No. 14/752,437, filed on Jun. 26, 2015, now Pat. No. 9,730,057, which is a (Continued)

(30) Foreign Application Priority Data

Feb. 4, 2010 (EP) ..................................... 10152660
Jul. 7, 2010 (EP) ..................................... 10168777

(51) Int. Cl.
*H04L 29/06* (2006.01)
*G06F 21/00* (2013.01)
(Continued)

(52) U.S. Cl.
CPC ...... *G11B 20/00086* (2013.01); *H04L 9/0833* (2013.01); *H04L 9/0836* (2013.01);
(Continued)

(58) Field of Classification Search
CPC .............. H04W 12/00; H04N 21/4405; H04N 21/2347; H04N 21/63345; H04N 21/4182;
(Continued)

(56) References Cited

U.S. PATENT DOCUMENTS

| 6,839,436 B1 * | 1/2005 | Garay ..................... H04L 9/083 380/273 |
| 2004/0114762 A1 | 6/2004 | Medvinsky |

(Continued)

FOREIGN PATENT DOCUMENTS

| FR | 2 850 822 | 8/2004 | |
| WO | WO 2007/138204 | 12/2007 | |
| WO | WO-2008150553 A2 * | 12/2008 | ........... H04L 9/0891 |

OTHER PUBLICATIONS

R. Aparna ; B.B. Amberker; "New group key computation technique for secure group communication"; 2008 IEEE 19th International Symposium on Personal, Indoor and Mobile Radio Communications, Year: Jul. 2008 | Conference Paper | Publisher: IEEE; pp. 1-5 (Year: 2008).*

(Continued)

*Primary Examiner* — Fatoumata Traore
*Assistant Examiner* — Courtney D Fields
(74) *Attorney, Agent, or Firm* — Oblon, McClelland, Maier & Neustadt, L.L.P.

(57) ABSTRACT

A technique to manage members of a group of decoders having access to broadcast data, each group member sharing a common broadcast encryption scheme (BES) comprising the steps of, in a stage for a decoder to become a group member, receiving keys pertaining to the position in the group according to the BES, receiving a current group access data comprising a current group access key, and in a stage of accessing broadcast data, using the current group access data to access the broadcast data, and in a stage of (Continued)

renewing the current group access key, sending a first group message comprising at lease a next group access key encrypted so that only non-revoked decoders can access it, said group message being further encrypted by the current group access key, updating the current group access key with the next group access key.

18 Claims, 4 Drawing Sheets

Related U.S. Application Data continuation of application No. 13/953,979, filed on Jul. 30, 2013, now Pat. No. 9,100,820, which is a continuation of application No. 13/020,650, filed on Feb. 3, 2011, now Pat. No. 8,526,614.

(51) Int. Cl.

| | | |
|---|---|---|
| *G11B 20/00* | (2006.01) | |
| *H04L 9/08* | (2006.01) | |
| *H04N 7/167* | (2011.01) | |
| *H04N 21/258* | (2011.01) | |
| *H04N 21/266* | (2011.01) | |
| *H04N 21/418* | (2011.01) | |
| *H04N 21/6334* | (2011.01) | |
| *H04N 21/2347* | (2011.01) | |
| *H04N 21/4405* | (2011.01) | |
| *G06F 17/00* | (2019.01) | |
| *H04L 9/00* | (2006.01) | |

(52) U.S. Cl.
CPC ......... *H04L 9/0891* (2013.01); *H04N 7/1675* (2013.01); *H04N 21/2347* (2013.01); *H04N 21/2585* (2013.01); *H04N 21/26606* (2013.01); *H04N 21/4182* (2013.01); *H04N 21/4405* (2013.01); *H04N 21/63345* (2013.01); *G11B 20/0021* (2013.01); *H04L 2209/601* (2013.01)

(58) Field of Classification Search
CPC ........... H04N 21/26606; H04N 7/1675; H04N 21/2585; H04L 9/0833; H04L 9/0836; H04L 9/0891; H04L 2209/601; G11B 20/00086; G11B 20/0021
See application file for complete search history.

(56) References Cited

U.S. PATENT DOCUMENTS

2004/0131187 A1* 7/2004 Takao ................. H04L 63/0428
380/255
2007/0140245 A1* 6/2007 Anjum ................. H04L 63/062
370/390
2009/0138704 A1 5/2009 Delerablee

OTHER PUBLICATIONS

European Search Report issued in EP 10 15 2660, completed May 28, 2010.
European Search Report issued in EP 10 15 2660, completed Sep. 23, 2010.
European Search Report issued in EP 10 16 8777, completed Jan. 10, 2011.
English language abstract of FR 2850822, published Aug. 6, 2004.
Masafumi Kusakawa et al., "Efficient Dynamic Broadcast Encryption and Its Extension to Authenticated Dynamic Broadcast Encryption", CANS 2008, LNCS 5339, pp. 31-48 (2008).
Cecile Delerablee et al, "Fully Collusion Secure Dynamic Broadcast Encryption with Constant-Size Ciphertexts or Decryption Keys", Pairing 2007. LNCS 4575, pp. 39-59 (2007).
Dan Boneh et al., "Collusion Resistant Broadcast Encryption with Short Ciphertexts and Private Keys", Crypto 2005, LNCS 3621, pp. 258-275 (2005).
Dan Boneh et al., "Fully Collusion Resistant Traitor Tracing with Short Ciphertexts and Private Keys", Eurocrypt 2006, LNCS 4004, pp. 573-592 (2006).
Dalit Naor et al., "Revocation and Tracing Schemes for Stateless Receivers", Advances in Cryptology, Crypto 2001, 21st Annual International Cryptology Conference, Santa Barbara, CA, Aug. 19-23, 2001, pp. 1-33, Feb. 24, 2001.
Yi-Chun Zhang et al., "Broadcast Encryption Scheme and Its Implementation on Conditional Access System", Proceedings of the 2009 International Symposium on Web Information Systems and Applications (WISA '09), pp. 379-382, May 22-24, 2009.
Pan Wang et al., "Storage-Efficient Stateless Group Key Revocation", retrieved from http://reeves.csc.ncsu.edu/papers-and-other-stuff/2004-09-ISC-key-revokation-paper.pdf, p. 1-12, Sep. 21, 2004.
Miodrag J. Mihaljevic et al,. "A Novel Broadcast Encryption Based on Time-Bound Cryptographic Keys", DRMTICS 2005, LNCS 3919, pp. 258-276 (2006).
David Lubiez et al., "Attribute-Based Broadcast Encyrption Scheme Made Efficient", AFRICACRYPT 2008, LNCS 5023, pp. 325-342 (2008).
Kogan et al., "A pratical revocation scheme for broadcast encryption using smart cards," Security and Privacy, 2003. Proceedings. 2003 Symposium on Digital Object Identifier. 10.1109/SECPRI.2003.1199339; Publication Year. Nov. 2003; pp. 225-235.
Susilo et al., "Recipient Revocalbe Identity Based Broadcast Encryption: How to Revoke Some Recipients in IBBE without Knowledge of the Plaintext;" ASIA CCS '16: Proceedings of the 11th ACM on Asia Conference on Computer Communications Security; Publication Year May 2016; Publisher: ACM; pp. 201-210.

* cited by examiner

APPARATUS FOR MANAGING MEMBERS OF AT LEAST ONE GROUP OF DECODERS HAVING ACCESS TO BROADCAST DATA

CROSS-REFERENCE TO RELATED APPLICATIONS

This application is a Continuation of U.S. patent application Ser. No. 14/752,437 filed Jul. 26, 2015, which is a Continuation of U.S. patent application Ser. No. 13/953,979 filed Jul. 30, 2013 (now U.S. Pat. No. 9,100,820, issued Aug. 4, 2015), which is a Continuation of U.S. patent application Ser. No. 13/020,650 filed Feb. 3, 2011 (now U.S. Pat. No. 8,526,614, issued Sep. 3, 2013), which claims the benefit of European Application No. 10152660.3 filed Feb. 4, 2010 and European Application No. 10168777.0 filed Jul. 7, 2010. All of the foregoing are incorporated by reference in their entireties.

INTRODUCTION

The present invention concerns the field of broadcast encryption method, i.e. a method to organize the distribution of keys into a group of users so that it is possible to manage the joining, the renewal and the revocation of one member of the group in an efficient way.

The Problem

The problem considered here is how to efficiently control access to broadcast content for a large population of subscribers using only a one-way broadcast feed as a communication channel via a key-based access control only.

Basic Approach

The natural solution to this problem is to encrypt the controlled asset (e.g. TV channel) with a unique key and give this key only to those subscribers who have paid for the service.

This works fine until the subscriber decides to cancel his subscription, at which point the key must be erased from that user's terminal.

This is essentially impossible in practice since sending a Cancel message to each cancelled subscriber requires bandwidth proportional to the number of cancelled subscribers and requires a high repetition rate to have any chance of being effective, which further increases the bandwidth requirements, to the point where it becomes simply impractical.

Moreover, a dishonest user may always filter those messages or make a copy of the key and continue using it after canceling his subscription.

Thus, in order to exclude a subscriber, the key must be revoked and a new key must be used instead. This requires however to send this new key to all remaining subscribers so that those paying for the service may still have access once the key changes.

This problem has been tackled in academia under the notion of broadcast encryption. However, state-of-the art broadcast encryption schemes are inadequate for Pay TV, either because of ciphertext linearly growing with the number of revoked users [2], or because of the decryption keys linearly depending on the number of users in the system [1].

Efficiency Problems

The challenge is to find a way to send this same key-renewal message to all subscribers except those who have cancelled their subscriptions, which usually represent a small percentage of the total population.

Sending an individual message to each subscriber over the broadcast feed requires bandwidth that is proportional to the subscribers population, which quickly represents too much bandwidth for a viable operation.

Thus some form of global message must be used. Such a message may contain addressing information that indicates to the receiver whether it is a valid recipient of the message. However, the protection layer on the message is necessarily done with a secret shared by all the subscribers and thus any terminal is capable of decrypting it and retrieving the new key carried in it regardless of whether the message is addressed to it or not. This means that the terminal is ultimately trusted not to make use of the key if not entitled to, which is not acceptable since the terminal is not trusted.

It should be stated that the present invention can not be seen as a new broadcast encryption method. Instead the present invention proposes a new way to dynamically use any broadcast encryption method without changing the keys pertaining to said broadcast encryption method. By dynamically we mean that revoked receivers leave and new receivers join the subset of authorized receivers without rekeying the entire broadcast encryption group. In fact, this invention allows efficient use of a static BE scheme by attributing the same position in the BE scheme to multiple receivers over time (but never more than one at any given time). Hence this invention is applicable to all broadcast encryption methods known in the art as well as future proposals.

DISCUSSION OF THE PRIOR ART

[4] Cecile Delerablee et al. "Fully Collusion Secure Dynamic Broadcast Encryption with Constant-Size Ciphertexts or Decryption keys"

This paper puts forward new efficient constructions for public-key broadcast encryption that simultaneously enjoy the following properties: receivers are stateless; encryption is collusion-secure for arbitrarily large collusions of users and security is tight in the standard model; new users can join dynamically i.e. without modification of user decryption keys nor ciphertext size and little or no alteration of the encryption key.

In this paper authors propose a new stateless broadcast encryption method based on bilinear maps. However, the ciphertext size (or decryption key size) depends linearly on the number of revoked receivers and grows with each revocation which is unacceptable for some industrial applications such as Pay-TV. It should be noted that our new method can be used on top of the proposed scheme to reduce the size of the ciphertext and/or avoid the rekeying problem.

[5] WO 2007/138204 A1 (France Telecom, Delerablee Cecile) "Cryptographic Method with Integrated Encryption and Revocation, System, Device and Programs for Implementing this Method"

This is the PCT application of the method proposed in [4].

[6] Pan Wang et al. "Storage-Efficient Stateless Group Key Revocation"

In this academic paper authors propose a new subset-cover scheme relying on hash chains which allows to reduce the bandwidth (ciphertext) from $O(R*\log(N/R))$ to $O(R)$ if compared with the Complete Subtree scheme from [2]. This is achieved at the cost of $O(N)$ calls to the one-way function, N being the total number of receivers. However, since it is a stateless scheme, once a receiver leaves the group either it should be continuously revoked from future communication messages with the ciphertext growing accordingly or all the authorized receivers should be somehow rekeyed. Our solution allows overcoming this problem and can be, in fact, used on the top of the scheme proposed by Wang et al. to reuse the keys of the receiver which has left the group for a new receiver without a re-keying process.

[7] Masafumi Kusakawa et al. "Efficient Dynamic Broadcast Encryption and Its Extension to Authenticated Dynamic Broadcast Encryption"

This document proposes two public-key broadcast encryption schemes. The Scheme1 is a variant of the dynamic broadcast encryption scheme proposed by Delerablee et al. The computational cost and the encryption (public) key size are more efficient than the original scheme. The authors observe that by using a decryption key in the original scheme, they can encrypt a message more efficiently without a part of an encryption key. In order to let any user receive this benefit, they introduce a "dummy key" which is similar to a decryption key. Scheme2 is an extension of Scheme1 to achieve an authenticated dynamic broadcast encryption scheme that enables receivers to verify the producer of broadcasted content. In Scheme2, they adopt the signature scheme proposed by Barreto et al. Scheme2 is supposed to be the first scheme that achieves provable security for broadcast encryption and signature with common parameters and keys. This academic paper is a technical improvement to the scheme proposed by Delerablee Cecile [4] with respect to the key storage but it still has the problem of bandwidth being linear in the number of revoked receivers.

[8] US 2004/114762 (General Instrument Corp., Alexander Medvinsky) "Subset Difference Method for Multi-Cast Rekeying"

This is a patent which describes a rekeying mechanism specific to the Subset Difference (SD) Method from [2]. In the original scheme the difference key was obtained by applying a one-way function to the receiver's unique key which was derived using the SD methodology. The new approach proposes applying a one-way function on the receiver's unique key along with current content-key. Hence the difference key changes from one revocation to another. Those skilled in the art would agree that applying a one-way function on a message along with a key (the secret key is the content key in this case) by using the secret suffix method suffers from attacks well known in the art (Bart Preneel, Paul C. van Oorschot: MDx-MAC and Building Fast MACs from Hash Functions. CRYPTO 1995). Our proposed solution is different since it does not need or use re-keying of the BE Scheme but instead uses any BE Scheme (possibly including this one) to exclude a revoked receivers from the automated updates of Group Access Key and content keys, consequently allowing a new receiver to inherit from the previous receiver's position. Our solution is completely independent of the broadcast encryption scheme and much more secure from the cryptographic point of view.

[9] FR 2 850 822 A1 (CANAL PLUS TECHNOLIES [FR]) "Système de télévision a péage, procédé de révocation dans un tel système, décodeur et cartes à puces associés, et message transmis à un tel décodeur".

This patent describes a revocation mechanism by which the revocation messages (Revocation EMM) are combined with the ECM in order to prevent filtering of those messages by the receiver. Our proposed solution overcomes the problem of filtering Revocation EMMs by using Positive Addressing: filtering of EMMs always results in loss of service by lack of renewal of the keys in the receiver. Consequently, the combination of Revocation EMMs and ECMs as described in the above document is not used in our system, nor is it required.

BRIEF DESCRIPTION OF THE INVENTION

The present invention aims at proposing a method allowing a versatile management of a group of decoders, this group having conditional access to audio/video content.

Accordingly, it is proposed a method to manage a population of decoders having access to broadcasted data, each decoder being temporarily assigned to a position in a group of decoders sharing a common broadcast encryption scheme allowing to revoke access of at least one member of the group by sending a global group addressed message, comprising the steps of:

a. In a stage for a decoder to become member of the group:
    selecting an available position in the group and allocating this position to the decoder, marking the position as not available
    sending, in a message to the decoder, the keys pertaining to said position into the group according to the broadcast encryption scheme, as well as a current group access data (CGD) comprising at least a current group access key (CGK) common to said group, said message being encrypted with a key that is unique to the decoder.
b. In a stage of accessing audio/video data in the decoder:
    using the current group access data (CGD) to directly or indirectly access to the broadcasted data,
c. In a stage of revoking at least one decoder and selectively renewing the current group access key (CGK) for the group:
    sending a global group addressed message comprising at least a next group access data (NGAD) comprising at least a next group access key (NGAK) encrypted using the broadcast encryption scheme so that only the non-revoked decoders can decrypt it, said group message being further encrypted by the current group access key (CGK) and declaring the position of the said revoked decoder as vacated.
        in the non revoked decoders, decrypting the message using the current group access key, further decrypting the result using broadcast encryption keys pertaining to the position in the group and storing the next group access data, in particular updating the next group access key.
        in the revoked decoder, decrypting the message using the current group access key, then failing to decrypt the result with the broadcast encryption keys pertaining to the position in the group and thus failing to update the next group access data and in particular the next group access key.
d. In a stage of reusing a position vacated by the previously revoked decoder:
    making said next group access key the current group access key.
    marking the previously vacated position in the group as available.
    starting the process from the step a.

The gist of the invention is to encrypt the renewal message not only according to keys accessible by the non-revoked decoders, but also with the current group access key. This has the consequence that the revoked decoder will not be able to decrypt the next group access key thanks to the encryption scheme taking into account the non-revoked decoder even if at that time, the revoked decoder has the current group access key.

For the next message, when the group access key is further renewed, it is no longer necessary to apply the encryption scheme taking into account the non-revoked decoders, but simply apply the encryption by a group key even if this group key is known by the revoked decoder. The additional encryption layer using the current group access key (which was not accessible to the revoked decoder while this key was renewed), forbid the access to the revoked decoder.

The chaining of the group access key has the consequence that when a revoked decoder has been excluded from renewing the group access key, it is no longer necessary to care about the revoked decoders while renewing later the group access key. The position into that group of the revoked decoder can be then quickly reallocated to a new member of the group, thereby maintaining the efficiency of the broadcast encryption scheme throughout the life of the system and effectively making the scheme practical even for systems with a very large population of decoders.

BRIEF DESCRIPTION OF THE FIGURES

The present application will be better understood thanks to the attached figures, in which.

DETAILED DESCRIPTION

The present application comprises two parts, the group key chaining and key distribution allowing an efficient revocation mechanism.

When a group access key is to be renewed, the message containing the new group access key is sent to the decoders of that group. The message is broadcasted so all decoders, even not belonging to that group can receive this message and the encryption will determine which decoders can really obtain the new group access key.

Let us take the example with a group of 256 decoders and two decoders should be revoked. Each decoder contains at least a master group key and a personal key. The new group access key is encrypted by the current group access key and by the keys only available in the decoders that are not revoked.

A simple example using a trivial broadcast encryption scheme can be to create firstly a cryptogram containing the new group access key and encrypted by the current group access key. This cryptogram CT is then encrypted with a decoder personal key. The message will then comprises 254 cryptograms, each being encrypted by a personal key of the non-revoked decoders. Of course, the inverse method is also applicable, the new group access key is firstly encrypted by the personal key of a non-revoked decoder and then encrypted by the current group access key.

For the next renewal of the group access key, so-called further next group access key, even if the revoked decoders still contain the master group key and their personal key, the next message will contain the further next group access key encrypted by the master key only and by the next group access key. Since the revoked decoders have not been able to access to the next group access key, this further next group access key is also not accessible for these decoders even if they have the master group key.

According to another example, the further next group access key is simply encrypted by the next group access key.

The second part of the invention is to propose a scheme that reduces greatly the size of the message when a revocation is to be carried out. One can imagine a group of 5000 decoders and only one is to be revoked. In this case, with the example above, the next group access key should be duplicated 4999 times, each time associated with the personal key of the non-revoked decoders.

Figure 4:
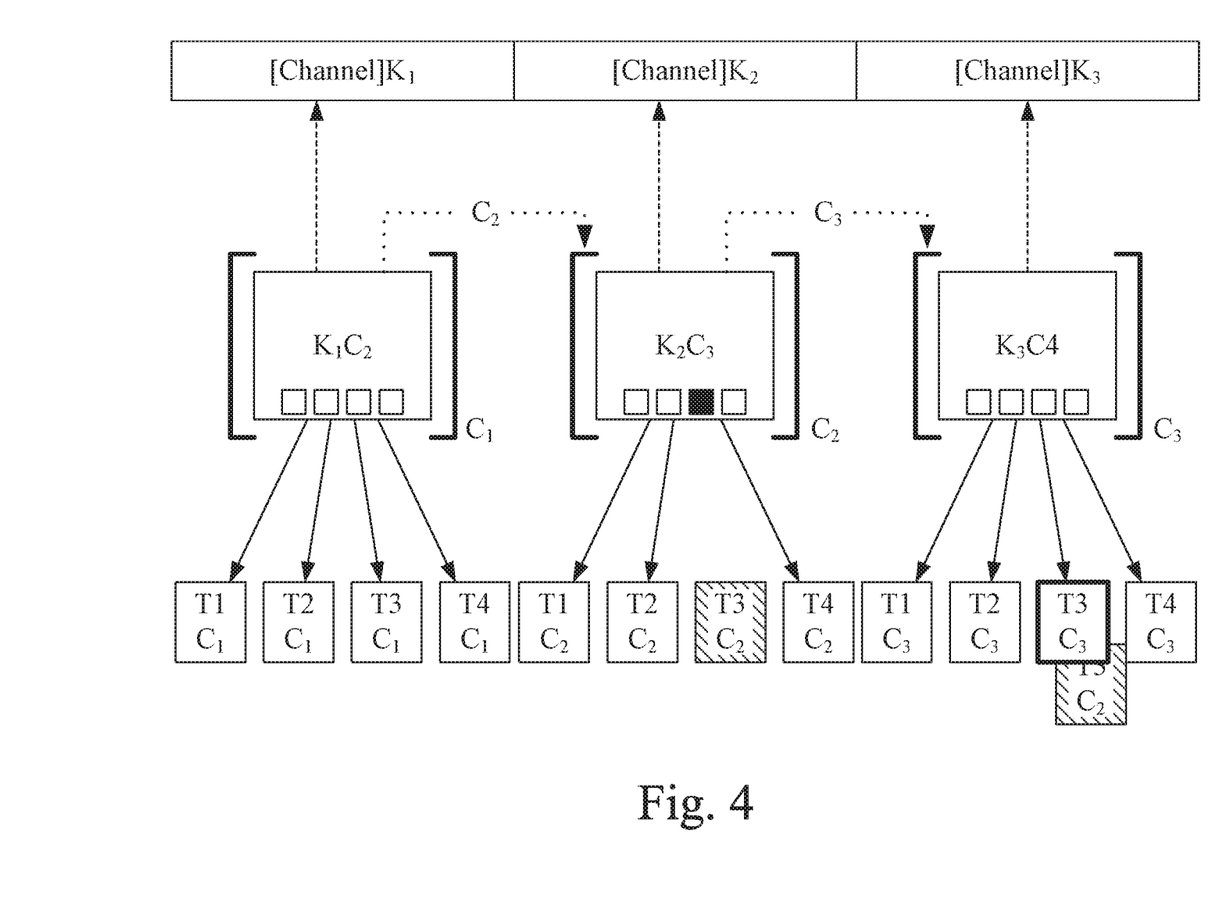
FIG. 4 illustrates the chaining of the group key

The FIG. 4 illustrates the process of revocation. The top part shows the audio/video product (could be one channel or a group of channels) encrypted by the key successively $K_1$, $K_2$ and $K_3$. It is to be noted that this key ($K_1$, $K_2$ or $K_3$) could be used to decrypt directly the audio/video product or serving as decryption key to decrypt the messages (ECM) containing the keys to decrypt the audio/video product.

In the example of the FIG. 4, during the first time period, the decoders T1, T2, T3 and T4 are part of the group. The group access key $C_1$ is the current one when the message $K_1C_2$ is arrived, containing the next group access key $C_2$ and the key $K_1$ to access the audio/video product. In fact, the product key $K_1$ will arrive before this key is used to decrypt the product. The decoders will store the current product key $K_1$ and when the next is received, the product key $K_2$, ready to be applied at the time the product swap from $K_1$ to $K_2$.

During the second time period, the group access key $C_3$ is sent to the non-revoked decoders. These decoders are T1, T2 and T4. The message $K_2C_3$ is encrypted by the current group access key $C_2$ and the keys pertaining to the non-revoked decoders T1, T2 and T4. The decoder T3, having the current group access key $C_2$, cannot decrypt this message and have access to the group access key $C_3$.

During the third time period, the message carrying the next group access key $C_4$ can be simply encrypted by the current group access key $C_3$. The position into the group of formerly T3 can be reallocated (to a decoder T30) by transmitting the current group access key $C_3$ and the key or keys previously distributed to the decoder T3. This reallocation can be executed only after the group access key $C_3$ is active i.e. after the transmission of the message $K_2C_3$.

The group is organized by the management system and each position into the group is associated with a position status. This status can comprises three states, namely "free", "allocated" and "transitional". At the creation of a group, all positions are marked "free". When a position is allocated to a member, this position is marked "allocated". As soon as a member is withdrawn of the group, the position is marked "transitional". This state indicates that the position was used before and special care is to be taken while reallocating this position. This position can be reallocated as soon as the group access key has been renewed into the members of this group at the exception of this specific member. The time between the revocation of the member until the group access key is changed for all other members is the so-called "quarantine" period. After this quarantine period, the position is virtually "free" and can be reused.

The management of the database of the management center regularly checks the status of the "transitional" positions and checks whether the group access key is no longer present into the revoked decoder attached to that position. In this case, the position can be modified from "transitional" to "free".

In the case that no regular scan of the database is carried out, the status of a specific position is determined when a new member is to be inserted into that group. This is why in the case that the position has the state "transitional", a further check is carried out to determine if the quarantine period is over.

The renewal message of the group access key is formed by the group access data (CGD) which includes at least the group access key (CGK). This key can be used to decrypt the entitlement messages (ECM) related to the services for which the group of decoders has access. As a consequence, the group access key serves for the chaining mechanism and to access the services.

According to another embodiment, the group access data comprises a session key SK. This session key SK will serves to access the services and decrypt the entitlement messages (ECM) related to these services.

According to another embodiment, when the group access data comprising the new group access key is received and stored in the non-revoked decoders, another message is sent to the decoders containing the session key SK. This message is then encrypted by the group access key, thus only the non-revoked decoders can decrypt and obtain this session key SK.

Personal Key Distribution

Although the group access key can be distributed according to any broadcast encryption scheme as described above, in order to efficiently generate a revocation message, the present invention will now describe an efficient way to organize the key distribution. The main property of an ideal Broadcast Encryption system can be summarized for the purpose of this invention:

Assuming each terminal in the system has been provisioned with a unique set of secrets, a server, knowing the secrets of each terminal, may encrypt a single message in a way that is both efficient (the message is small) and that can be decrypted by authorized terminals but not by excluded (revoked) terminals even if all revoked terminals collude together.

Proposed Scheme

A particular scheme is considered here to illustrate the working principle of the invention. It is described in [3], however, it is to be noted that due to its severe lack in collusion resistance its use is not recommended in practice and it is only used here for its simplicity and for illustrative purposes.

Assuming the following conventions:
n is the total population of terminals in the broadcast encryption scheme
r is the number of terminals revoked in an encrypted message
log is the logarithm base 2
k is the size in bytes of keys in the system (value assumed here is 128 bits=16 bytes)

Then:
each terminal must store $(\log(n)+1)*k$ bytes of key material
the size of the encrypted message is at most: $n/8+k+$ payload size bytes
the terminal must perform at most $r*(\log(n)-1)$ crypto operations to retrieve the message encryption key Description The mechanism operates on a population of $n=2^m$ terminals. A binary tree of keys is built as illustrated in the FIG. 1 for this population using a one way function to derive the key of each branch from the key of the node above.

Figure 1:
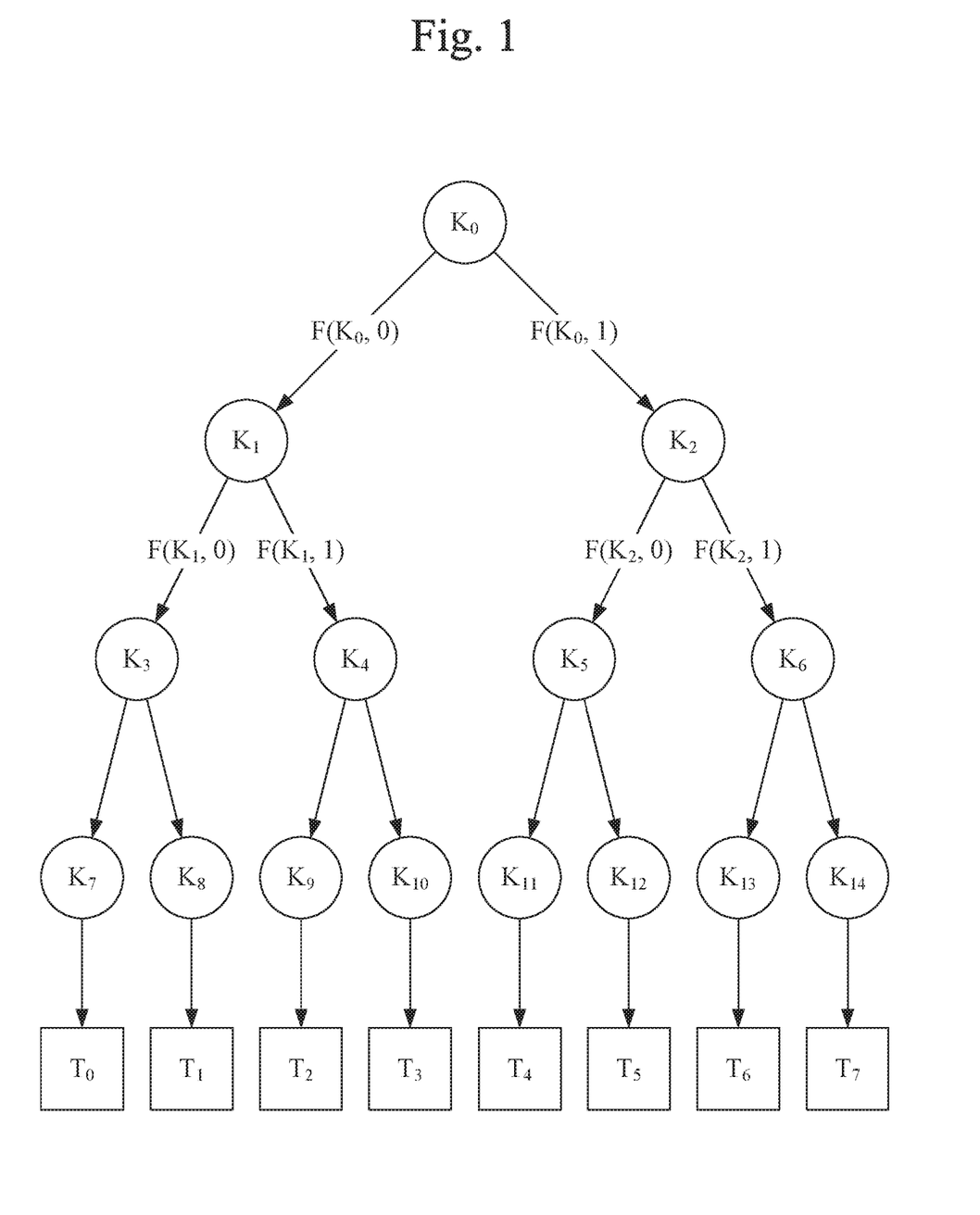
FIG. 1 illustrates a broadcast encryption tree

The $f(K,n)$ function is a public one-way function (e.g. hash primitive) that derives a key from its two parameters.

Each Terminal is assigned a leaf key, as depicted above, however, this key is not given to the terminal, instead, each terminal is given the key of all the other terminals in the group, or the means to compute them. For instance, as illustrated in the FIG. 2, the keys provided to terminal $T_2$ are $K_{10}$, $K_3$ and $K_2$.

Figure 2:
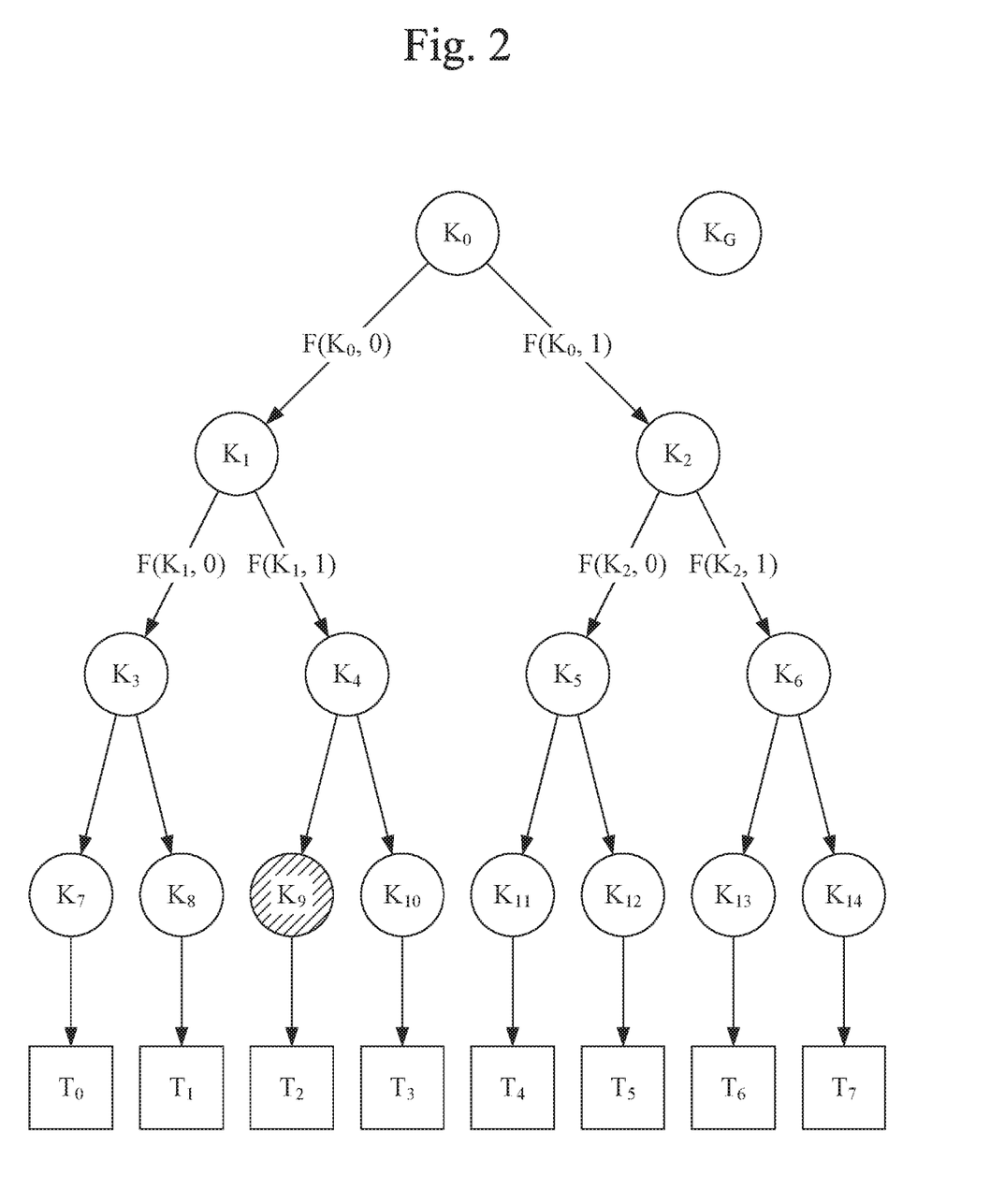
FIG. 2 illustrates the case with the terminal T2
Figure 3:
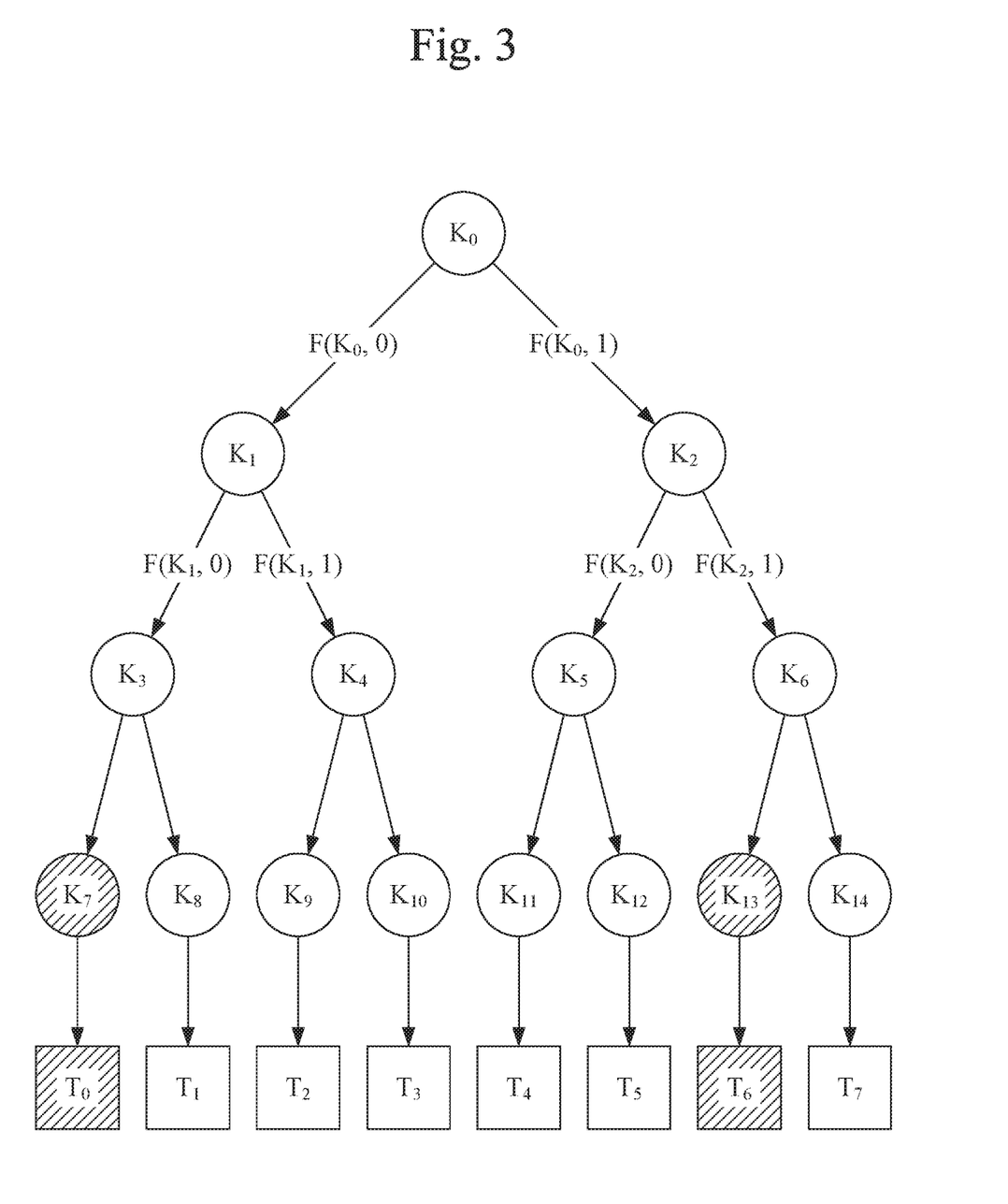
FIG. 3 illustrates the case for excluding terminals

Using $K_3$, $T_2$ can compute $K_7$ and $K_8$, and using $K_2$, it can compute $K_{11}$ to $K_{14}$, through $K_5$ and $K_6$.

When joining the group, each terminal then effectively receives $\log_2(n)$ keys, plus an additional Group key $K_G$ used for addressing a message to all members of the group.

Once this is in place, any message that must be sent to the group or subset of the group is encrypted in the following way:
If the message is targeted to all terminals in the group, it is encrypted with the Group key, $K_G$ which is known to all terminals
If the message is targeted to a subset of the terminals in the group, a key is built by hashing together the keys assigned to each excluded terminals, and the message is encrypted with this key: $K=\text{Hash}(K_a, K_B, \ldots, K_z)$.

For example, if terminals $T_0$ and $T_6$ are excluded, keys $K_7$ and $K_{13}$ are hashed together to compute a key and the message is encrypted with it.

Since $T_0$ and $T_6$ do not know their respective keys, they can not compute the final key, while all the other terminals in the group can compute these keys and thus access the content of the message.

The resulting encrypted message is essentially the same size as the original, only padding and the use of a session key slightly increase its size.

In addition to the message itself, some signaling must be added so that receiving terminals know whether they are excluded or not and how to compute the keys. This is done using a bitmap where each bit corresponds to a terminal and indicates whether that terminal is included in the recipient or not. The bitmap may be compressed under certain conditions.

Limitations

Some mechanism must be introduced to reach an addressable population of tens of millions while keeping the number of revoked terminals to a minimum (and thus the bandwidth to an acceptable level).

The first goal is easily met by splitting the total population into a number of subsets of the adequate size and managing each subset as an independent population.

The second goal is more difficult to meet without a dedicated mechanism for revoked population control. The Dynamic Group Management mechanism described below proposes to solve this problem.

Dynamic Group Management

Principle

The principle of operation is the following:
The content is put up for sale in packages, typically by grouping a number of services in independent products. The unit of sale, and thus the unit of control, is the product.
For each product, the population of terminals subscribed to this product is split in a number of groups, for which an independent Broadcast Encryption system is generated (for instance using methods well-known in the art). The number of groups is proportional with the actual population of subscribers for this product (population divided by the group size), not with the total population of terminals.
Upon subscribing to a product, a slot is allocated to the terminal in one of the groups associated to this product (a new group is created if needed). The unique set of keys corresponding to this slot is sent to the terminal using a message addressed to this particular terminal. An additional key is also provided, the Group Access Key, which use is described below
On a regular basis (e.g. every day), a Positive Addressing message is generated for each group of terminals of each product. This PA message contains all the keys required to access the content of the product over the next period of control (e.g. the next week or month). This PA message is encrypted using the Broadcast Encryption primitive for this group of terminals, and is further over-encrypted with the Group Access Key.

Upon cancellation of a subscription by the user, the terminal is put in the list of revoked terminals for its group (for this particular product). In the next PA message, those terminals that are revoked may decrypt the first layer of encryption using the Group Access Key, however, they are not capable of decrypting the underlying message, by virtue of the Broadcast Encryption scheme. As a consequence, these terminals cannot retrieve the content keys for the next period of control and are thus unable to access the content. Furthermore, they cannot retrieve the next Group Access Key which is covered by the Broadcast Encryption and are thus effectively definitively excluded from this group.

As soon as the last Group Access Key given to a revoked terminal is replaced by a new one, the slot of the revoked terminal may be assigned to a new subscribing terminal.

The diagram of the FIG. 4 illustrates the principle:

$T_n$ indicates a terminal, the solid arrows indicate the ability of the targeted terminal to access the message in the middle layer of the diagram. This message is the PA message addressing a subset of the terminal population with the Broadcast Encryption scheme, containing the Service Keys $K_n$ and over encrypted with the Group Access Key $C_n$.

Benefits

Using Dynamic Groups provides three majors benefits:

The first benefit is that the number of the PA EMM generated for any Product is directly proportional to the number of subscribers to that product, not to the total population of subscribers. Thus, if a product is purchased by a minority, the PA bandwidth required to maintain it is small.

The second benefit is that the population of receivers targeted by any PA EMM is extremely homogeneous: indeed, all receivers have purchased that product and only a small percentage of them have cancelled it. This means that the addressing bit field, which indicates which receivers in the PA Group are revoked is essentially composed of bits set to '1' and thus can be compressed. A simple and efficient compression algorithm will provide a compression ratio of 1/14 for a 0% revocation rate, 1/6 for a 2% revocation rate and still 1/3 for a 5% revocation rate.

The third benefit is that slots in the group are recycled: when a terminal is excluded from the group, its slot is reassigned to a new terminal, constantly keeping the number of revoked slots in the group to a minimum (no more than 2%-3% in the ideal case).

Fourth benefit is that any broadcast encryption method can be used, such as previously known in the art, as well as new ones, hence improving even more the efficiency (bandwidth, terminal key storage and/or encryption/decryption complexity) of the entire system.

All these put together allow for a very efficient use of the broadcast bandwidth.

REFERENCES

[1] Dan Boneh, Craig Gentry, Brent Waters: Collusion Resistant Broadcast Encryption with Short Ciphertexts and Private Keys. CRYPTO 2005

[2] Dalit Naor, Moni Naor, Jeffery Lotspiech: Revocation and Tracing Schemes for Stateless Receivers. CRYPTO 2001

[3] OMA DRM v2.0 Extensions for Broadcast Support, OMA-TS-DRM_XBS-V1_0-20081209-C.pdf, Chapter C.17

[4] Cecile Delerablee et al. "Fully Collusion Secure Dynamic Broadcast Encryption with Constant-Size Ciphertexts or Decryption keys", Pairing 2007

[5] WO 2007/138204 A1 (France Telecom, Delerablee Cecile) "Cryptographic Method with Integrated Encryption and Revocation, System, Device and Programs for Implementing this Method"

[6] Pan Wang et al. "Storage-Efficient Stateless Group Key Revocation", ISC 2004

[7] Masafumi Kusakawa et al. "Efficient Dynamic Broadcast Encryption and Its Extension to Authenticated Dynamic Broadcast Encryption", CANS 2008

[8] US 2004/114762 (General Instrument Corp., Alexander Medvinsky) "Subset Difference Method for Multi-Cast Rekeying"

[9] FR 2 850 822 A1 (CANAL PLUS TECHNOLIES [FR]) "Système de télévision a péage, procédé de révocation dans un tel système, décodeur et cartes à puces associés, et message transmis à un tel décodeur".

The invention claimed is:

1. A management system for managing a population of terminals having access to transmitted data, each terminal being temporarily assigned to a position in a group of terminals and sharing a common broadcast encryption scheme, the management system comprising:
   circuitry configured to
      revoke a terminal from the group, each of the terminals in the group having a unique set of keys associated with a position of the respective terminal in a static position structure of the group using the common broadcast encryption scheme, the revoked terminal leaving a vacated position in the common broadcast encryption scheme of the group;
      renew a current group access key common to the terminals of the group by transmitting a global group addressed message comprising at least a next group access key encrypted using the common broadcast encryption scheme to the terminals of the group so that only terminals corresponding to non-revoked positions in the group can decrypt the transmitted global group addressed message; and
      reuse the vacated position in the common broadcast encryption scheme by making said next group access key the current group access key, marking the vacated position in the group as available and making another terminal a member of the group by providing, to the another terminal, the unique set of keys associated with the vacated position or another available position in the group.

2. The system of claim 1, wherein the another terminal is made a member of the group by:
   allocating a position in the group to the another terminal, the allocated position being the vacated position or another available position;
   marking the allocated position as not available in a system database; and
   sending, in a message to the another terminal, the unique set of keys pertaining to said allocated position in the group according to the common broadcast encryption scheme, as well as the current group access key common to said group, said message being encrypted with a key that is unique to the another terminal.

3. The system of claim 2, wherein selection of the position for allocation starts with a position adjacent to an already allocated position so as to concentrate allocated positions in a consecutive manner.

4. The system of claim 2, wherein selection of the position for allocation starts with a position between two already allocated positions so as to concentrate allocated positions in a consecutive manner.

5. The system of claim 1, wherein the global group addressed message further comprises group access data comprising a session key, said session key being used to access audio/video data pertaining to the group.

6. The system of claim 1, wherein the circuitry is further configured to send a second group message comprising a session key, said second group message being encrypted by the current group access key, said session key being usable by the terminals of the group to access audio/video data pertaining to the group.

7. The system of claim 1, wherein the global group addressed message further comprises a cryptogram for each non-revoked terminal, each cryptogram being encrypted with a key unique to the respective non-revoked terminal in addition to being encrypted with the current group access key.

8. The system of claim 1, wherein said global group addressed message is further encrypted by the current group access key.

9. The system of claim 1, wherein
each of the population of terminals is assigned to at least one of a plurality of groups, and
the steps of revoking, renewing, and reusing are performed with respect to a group of the plurality of groups from which the terminal is revoked.

10. A broadcast management system comprising:
a plurality of terminals having access to transmitted data, each terminal being temporarily assigned to a position in a group of terminals and sharing a common broadcast encryption scheme, each of the terminals in the group having a unique set of keys associated with a position of the respective terminal in a static position structure of the group using the common broadcast encryption scheme; and
a management center being configured for communication with the plurality of terminals, the management center including circuitry configured to
revoke a terminal from the group, the revoked terminal leaving a vacated position in the common broadcast encryption scheme of the group,
renew a current group access key common to the terminals of the group by transmitting a global group addressed message comprising at least a next group access key encrypted using the common broadcast encryption scheme to the terminals of the group so that only terminals corresponding to non-revoked positions in the group can decrypt the transmitted global group addressed message, and
reuse the vacated position in the common broadcast encryption scheme by making said next group access key the current group access key, marking the vacated position in the group as available and making another terminal a member of the group by providing, to the another terminal, the unique set of keys associated with the vacated position or another available position in the group.

11. The system of claim 10, wherein each of the plurality of terminals is configured to:
access transmitted data using the current group access key, and
in the terminals corresponding to the non-revoked positions, first decrypt the global group addressed message using the current group access key, second decrypt a result of the first decryption using the unique set of keys pertaining to a position of the respective terminal in the group, and renew the current group access key with the next group access key resulting from the second decryption.

12. The system of claim 11, wherein the another terminal is made a member of the group by:
allocating a position in the group to the another terminal, the allocated position being the vacated position or another available position;
marking the allocated position as not available in a system database; and
sending, in a message to the another terminal, the unique set of keys pertaining to said allocated position in the group according to the common broadcast encryption scheme, as well as the current group access key common to said group, said message being encrypted with a key that is unique to the another terminal.

13. The system of claim 12, wherein selection of the position for allocation starts with a position adjacent to an already allocated position so as to concentrate allocated positions in a consecutive manner.

14. The system of claim 12, wherein selection of the position for allocation starts with a position between two already allocated positions so as to concentrate allocated positions in a consecutive manner.

15. The system of claim 10, wherein the global group addressed message further comprises group access data comprising a session key, said session key being used to access audio/video data pertaining to the group.

16. The system of claim 10, wherein the circuitry is further configured to send a second group message comprising a session key, said second group message being encrypted by the current group access key, said session key being usable by the terminals of the group to access audio/video data pertaining to the group.

17. The system of claim 10, wherein the global group addressed message further comprises a cryptogram for each non-revoked terminal, each cryptogram being encrypted with a key unique to the respective non-revoked terminal in addition to being encrypted with the current group access key.

18. The system of claim 10, wherein said global group addressed message is further encrypted by the current group access key.

* * * * *